United States Patent
von Borstel

(10) Patent No.: US 7,903,714 B2
(45) Date of Patent: Mar. 8, 2011

(54) GUIDING A BEAM FROM AN UNSTABLE LASER RESONATOR

(75) Inventor: Michael von Borstel, Pleidelsheim (DE)

(73) Assignee: Trumpf Laser-und Systemtechnik GmbH, Ditzingen (DE)

( * ) Notice: Subject to any disclaimer, the term of this patent is extended or adjusted under 35 U.S.C. 154(b) by 35 days.

(21) Appl. No.: 12/345,920

(22) Filed: Dec. 30, 2008

(65) Prior Publication Data

US 2009/0180510 A1   Jul. 16, 2009

Related U.S. Application Data

(63) Continuation-in-part of application No. PCT/EP2007/001137, filed on Jun. 27, 2007.

(30) Foreign Application Priority Data

Jun. 30, 2006   (DE) .................. 10 2006 030 799

(51) Int. Cl.
*H01S 3/22* (2006.01)
*H01S 3/08* (2006.01)

(52) U.S. Cl. ............................ 372/55; 372/92
(58) Field of Classification Search ............... 372/55–64
See application file for complete search history.

(56) References Cited

U.S. PATENT DOCUMENTS

| 4,556,875 | A | | 12/1985 | Ishiwatari |
| 4,802,184 | A | * | 1/1989 | Karube ........................... 372/82 |
| 5,022,041 | A | * | 6/1991 | Jacobs ............................ 372/70 |
| 5,327,446 | A | | 7/1994 | Waynant |
| 5,729,646 | A | * | 3/1998 | Miyagi et al. ................. 385/125 |
| 6,331,993 | B1 | * | 12/2001 | Brown ............................ 372/55 |
| 6,343,174 | B1 | * | 1/2002 | Neuberger ..................... 385/123 |
| 6,603,789 | B1 | * | 8/2003 | Kleinschmidt ................. 372/57 |
| 7,373,062 | B2 | | 5/2008 | Huber |
| 2002/0142465 | A1 | * | 10/2002 | Kobayashi et al. ........... 435/448 |
| 2005/0025965 | A1 | | 2/2005 | Sanghera et al. |
| 2005/0259944 | A1 | * | 11/2005 | Anderson et al. ............. 385/147 |
| 2007/0201529 | A1 | * | 8/2007 | Neumann et al. .............. 372/55 |

FOREIGN PATENT DOCUMENTS

| DE | 2313898 | 3/1974 |
| DE | 35 16 232 | 11/1986 |
| DE | 198 15 306 | 11/1998 |
| DE | 102 08 485 | 9/2003 |
| DE | 695 35 032 | 10/2006 |
| EP | 0 305 893 | 8/1988 |

(Continued)

OTHER PUBLICATIONS

International Preliminary Report on Patentability for corresponding PCT Application No. PCT/EP2007/001137, mailed Jan. 6, 2009, 6 pages.

(Continued)

*Primary Examiner* — Minsun Harvey
*Assistant Examiner* — Phillip Nguyen
(74) *Attorney, Agent, or Firm* — Fish & Richardson P.C.

(57) ABSTRACT

A gas laser includes an unstable laser resonator disposed in a laser housing, and a beam guide configured to guide a laser beam decoupled from the laser resonator out of the laser housing. The laser beam is coupled into the beam guide, and the beam guide is an optical fiber that extends out of the laser housing and guides the beam from the housing.

13 Claims, 3 Drawing Sheets

FOREIGN PATENT DOCUMENTS

| | | |
|---|---|---|
| EP | 0 446 799 | 9/1991 |
| EP | 0 911 922 | 4/1999 |
| JP | 05 283766 | 10/1993 |

OTHER PUBLICATIONS

Notification of Transmittal of Translation of the International Preliminary Report on Patentability for corresponding PCT Application No. PCT/EP2007/001137, mailed Jan. 13, 2009, 8 pages.

Sato S. et al. "High Power 5-μm-band CO Laser and its New Hollow Waveguides for Industrial Applications" SPIE, vol. 3268, XP002457127.

Matsuura Y et al. "Hollow Fibers for Delivery of High-power Lasers" Proc. of SPIE, vol. 4065 (2000) XP002457128.

\* cited by examiner

GUIDING A BEAM FROM AN UNSTABLE LASER RESONATOR

CROSS-REFERENCE TO RELATED APPLICATIONS

This application is a continuation-in-part of and claims priority under 35 U.S.C. §120 to PCT Application No. PCT/EP2007/001137, filed on Jun. 27, 2007, which claims priority to German Patent Application No. DE 10 2006 030 799.2, filed on Jun. 30, 2006. The contents of these priority applications are hereby incorporated by reference in their entirety.

TECHNICAL FIELD

This disclosure relates to guiding beams from gas lasers having unstable laser resonators.

BACKGROUND

A gas laser having an optically unstable laser resonator is disclosed, for example, by the slab laser of EP 0305893A2 and the coaxial laser of EP 0911922A1. The two gas lasers mentioned have laser resonators which are unstable in one direction. The slab laser constitutes a modification of a waveguide laser, where the gas volume is delimited in two directions by wall faces which constitute an optical waveguide. In the slab laser, the waveguide is provided only in one direction, whilst the laser beam is not delimited by wall faces in the second direction and can propagate freely. The coaxial laser has an unstable laser resonator in the azimuthal direction and a stable laser resonator with free beam propagation in the radial direction. In gas lasers, the laser resonator is typically closed with respect to the environment in a gas-tight manner, owing to the gaseous laser medium. In optically unstable laser resonators, the laser beam is discharged from the laser resonator via an aperture in or beside a resonator mirror. That decoupling aperture is typically closed by a zinc selenide (ZnSe) or diamond decoupling window so that the laser resonator is closed in a gas-tight manner.

Laser beams may be guided by optical fibers in solid-state and diode lasers. Gas lasers such as, for example, carbon dioxide ($CO_2$) and Er:YAG gas lasers, typically cannot be guided by conventional glass fibers because, at wavelengths greater than 2 µm, the laser radiation is absorbed in an intensified manner and the losses increase drastically. Therefore, the beam guiding is carried out, in lasers having wavelengths greater than 2 µm, in free beam propagation using transmitting and reflective optical elements such as, for example, lenses and/or mirrors.

SUMMARY

In one general aspect, a gas laser includes an unstable laser resonator disposed in a laser housing, and a beam guide configured to guide a laser beam decoupled from the laser resonator out of the laser housing. The laser beam is coupled into the beam guide, and the beam guide is an optical fiber that extends out of the laser housing and guides the beam from the housing.

Implementations may include one or more of the following features. The laser resonator may have a decoupling aperture configured to decouple the laser beam from the laser resonator and introduce the laser beam into a coupling chamber in which the decoupled laser beam is coupled into the optical fiber. An optical focusing unit may be arranged in the coupling chamber and configured to couple the laser beam into the optical fiber. The optical focusing unit may include a focusing mirror. The optical fiber may have a solid core. The optical fiber may be hollow. The hollow fiber may have a discharge end that is closed by a transmissive window. The transmissive window may include a focusing lens. The hollow fiber may have a discharge end that is open to atmosphere. The hollow fiber may have a discharge end that is connected to a laser gas exchange unit configured to pump laser gas out of the laser housing or into the laser housing via the hollow fiber. The laser gas exchange unit may be controlled by laser gas pressure in the laser resonator. The hollow fiber may have a discharge end that opens in a processing head of a laser processing machine.

In some implementations, the gas laser may be a slab laser. The gas laser may be a coaxial laser. The beam guide may include one or more of an internally coated hollow fiber that includes quartz, a Bragg reflection fiber and a photonic bandgap fiber that includes chalcogenide.

In another general aspect, laser gas in an unstable laser resonator of a gas laser provided in a laser housing is exchanged. Laser gas included in a laser housing of a gas laser is pumped out of the laser housing or into the laser housing, the pumping occurring through a hollow optical fiber through which a laser beam produced in the laser resonator is guided out of the laser housing. The laser beam produced in the laser resonator is guided out of the laser housing.

Implementations may include pumping gas with a gas exchange unit coupled to the hollow optical fiber.

As discussed below, a laser beam produced in an unstable laser resonator of a gas laser may be guided out of a laser housing in a cost-effective and reliable manner. The techniques discussed below have use at least in various types of gas lasers that have an unstable laser resonator in at least one direction, where the laser beam is decoupled from the laser resonator by a decoupling aperture. The laser beam may be guided out of the laser housing by a beam guide, such as an optical fiber.

In one implementation, the guiding device is an optical fiber that extends out of the laser housing. The laser beam which is decoupled from the laser resonator is coupled into the optical fiber and is guided out of the laser housing.

With the development of new optical fibers such as, for example, "photonic bandgap" fibers and "hollow silica waveguide" fibers, laser beams having relatively long wavelengths (e.g., wavelengths greater than 2 µm), such as, for example, carbon dioxide ($CO_2$) and Er:YAG lasers, can also be guided by optical fibers. In some implementations, the laser beam produced in the unstable laser resonator is coupled into an optical fiber inside the laser housing and is thereby guided out of the laser housing. It is thereby possible to dispense with a decoupling window, which was previously used in unstable laser resonators and which may be composed, for example, of zinc selenide (ZnSe) or diamond. In other words, one form of the invention involves the use of an optical fiber as a closure of the laser resonator with respect to the environment, rather than using a decoupling window for the gas-tight closure of the laser resonator. This form of the invention does not require transmissive optical units between the laser resonator and the optical fiber.

The laser resonator may have a decoupling aperture, by which the laser beam is decoupled from the laser resonator and is introduced into a coupling chamber of the laser housing. In the coupling chamber, the laser beam, which is decoupled from the laser resonator, is coupled into the optical fiber. The coupling chamber is connected to the laser resonator by the decoupling aperture and is therefore also filled with laser gas. In one implementation, an optical focusing unit (for example, a focusing mirror) is arranged in the coupling chamber and concentrates the laser beam, which is decoupled from the laser resonator, onto the input end of the optical fiber and couples the decoupled laser beam into the optical fiber. In this implementation, the coupling chamber, that is to say, a space between the laser resonator and the fiber input, is filled with laser gas and the optical focusing unit is thereby protected from contamination.

In some configurations, the optical fiber is formed from solid material or includes, for example, an outer hollow fiber whose empty space is filled with a material that is transmissive for the laser beam wavelength.

In one configuration, the optical fiber is a hollow fiber (i.e., a hollow waveguide). That hollow fiber constitutes a small resonator leak, which results in a gas flow in one or other direction in accordance with pressure relationships between the laser resonator and the environment. The leak rate is low and can be disregarded for long hollow fibers. This concept may be used with all types of hollow fiber, such as, for example, internally coated hollow fibers including quartz, Bragg reflection fibers or photonic bandgap fibers that include chalcogenide. The internal diameters of the hollow fibers are preferably smaller than or equal to 1.2 mm. In some implementations, the internal diameter is smaller than 0.8 mm. The hollow fibers form the closure of the laser resonator with respect to the environment so that it is possible to dispense with a decoupling window for the gas-tight closure of the laser resonator and transmissive optical units are not provided between the laser resonator and the hollow fiber.

In some implementations, the hollow optical fiber is closed by a transmissive window at the end thereof, which extends out of the laser housing, with a focusing lens. This solution allows any pressure adjustment in the hollow fiber. The discharge end of the hollow fiber can be operated, for example, at the pressure level of the laser resonator and the hollow fiber itself can be used as a pressure-tight laser gas closure. Therefore, it is also possible to reduce the pressure of the space, in which the discharge end of the optical fiber extending out of the laser housing opens, so that laser gas can be pumped out of the laser resonator via the hollow optical fiber. In some implementations, an aerodynamic window is placed downstream of the hollow optical fiber.

In some cases, the hollow optical fiber is open towards the atmosphere at the discharge end thereof which extends out of the laser housing.

In some instances, the hollow optical fiber is connected, at the discharge end thereof which extends out of the laser housing, to a laser gas exchange unit that pumps laser gas out of the laser housing and/or pumps laser gas into the laser housing via the hollow optical fiber. That laser gas exchange unit may be, for example, a laser gas source which brings about a laser gas flow in one or other direction by corresponding control of elevated pressure or reduced pressure inside the hollow optical fiber. The laser gas pressure in the laser resonator may be controlled to the desired value by corresponding control of the laser gas exchange unit. The laser gas exchange unit may also be a vacuum pump in order to pump laser gas out of the laser resonator or the laser housing.

The gas laser may be, for example, a slab laser of the type set out in EP 0305893A2 or a coaxial laser of the type set out in EP 0911922A1. Other gas laser types having an unstable laser resonator may be used.

In some implementations, laser gas in an unstable laser resonator of a gas laser provided in a laser housing may be exchanged, with laser gas being pumped out of the laser housing and/or laser gas being pumped into the laser housing via a hollow optical fiber. The laser beam produced in the laser resonator is guided out of the laser housing by the hollow optical fiber.

Further features and advantages of the techniques discussed above ensue from the following description of examples, from the figures, and from the claims. The individual features can be put into effect in a variant of the techniques discussed either individually, or in a plurality of any kind of combination.

DETAILED DESCRIPTION

Figure 1:
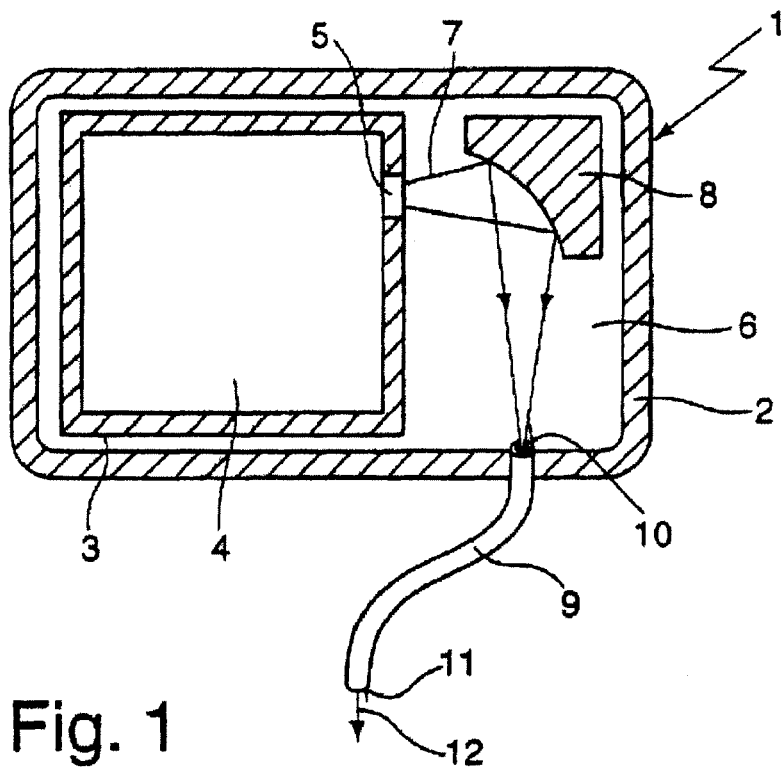
FIG. 1 is a an illustration of a first configuration of a gas laser having a hollow optical fiber, which is open towards the atmosphere, to guide a laser beam out of a laser housing.

Referring to FIG. 1, a first configuration of a gas laser 1 has a laser housing 2 having a laser resonator 3, which is optically unstable at least in one direction and whose resonator space 3 is a discharge space 4 filled with laser gas. The laser beam produced in the laser resonator 3 is de-coupled from the laser resonator 3 via a decoupling aperture 5 and is introduced into a coupling chamber 6 of the laser housing 2. At that location, the laser beam 7, which is decoupled from the laser resonator 3, is concentrated by an optical focusing unit 8 in the direction towards an input end 10 of an optical fiber 9. The focusing unit 8 may be, for example, a focusing mirror. The laser beam 7 is coupled into the hollow optical fiber 9 (which may be referred to as a hollow fiber), which extends out of the laser housing 2 and which is open towards the atmosphere at the discharge end 11 thereof.

The hollow optical fiber 9 may be, for example, an internally coated hollow fiber made from quartz, a Bragg reflection fiber or a photonic bandgap fiber that includes chalcogenide. The internal diameter of the hollow fiber 9 may be smaller than or equal to 1.2 mm. In some implementations, the internal diameter is smaller than 0.8 mm. The hollow optical fiber 9 closes the laser resonator 3 with respect to the environment so that it is possible to dispense with a decoupling window to form a gas-tight closure of the laser resonator 3. Thus, transmissive optical units are not provided between the laser resonator 3 and the hollow optical fiber 9.

The coupling chamber 6 is connected to the gas-filled discharge space 4 of the laser resonator 3 by the decoupling aperture 5 and is, therefore, also filled with laser gas. The hollow optical fiber 9 consequently constitutes a small resonator leak which results, depending on pressure relationships, in a gas flow within the hollow optical fiber 9 in one or other direction. The leak rate is low and can be disregarded for long hollow fibers. A laser beam which is discharged from the hollow optical fiber 9 at the discharge end 11 is designated 12.

The laser beam 7 is decoupled from the laser resonator 3 by the decoupling aperture 5 and is introduced into the coupling chamber 6 of the laser housing 2. In the coupling chamber 6, the laser beam 7, which is decoupled from the laser resonator 3, is coupled into the optical fiber 9. The coupling chamber 6 is connected to the laser resonator 3 by the decoupling aperture 5 and is therefore also filled with laser gas. In the example shown in FIG. 1, the optical focusing unit 8 is arranged in the coupling chamber 6 and concentrates the laser beam 7, which is decoupled from the laser resonator 3, onto the input end 10 of the optical fiber 9 and couples it into the optical fiber 9. In this implementation, the coupling chamber 6 (the space between the laser resonator 3 and the input end 10 of the optical fiber 9) is filled with laser gas and the optical focusing unit 8 is thereby protected from occurrences of contamination.

In some implementations, the laser beam 7, which is decoupled from the laser resonator 3, is coupled into the input end 10 of the hollow optical fiber 9 without the coupling chamber 6 or the optical focusing unit 8. In these implementations, the laser beam 7 is directly coupled from the laser resonator 3 into the hollow optical fiber 9 and is guided out of the laser housing 2 by the hollow optical fiber 9. For example, to directly couple the laser beam 7 into the hollow optical fiber 8, the laser beam 7 exits the laser resonator 3 through the decoupling aperture 5 and is imaged onto the input end 10 of the hollow optical fiber 9 without passing through the coupling chamber 6 and without being reflected from an optical element such as the optical focusing unit 8.

Figure 2:
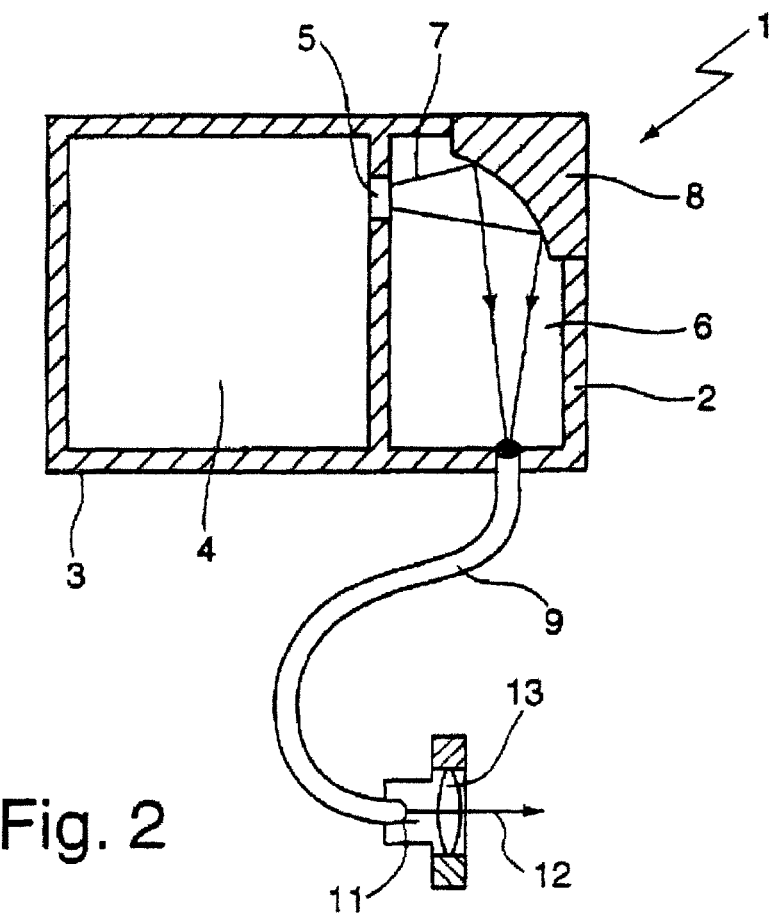
FIG. 2 is an illustration of a second configuration of the gas laser having a hollow optical fiber, which is closed by a transmissive window, to guide the laser beam out of the laser housing.

Referring to FIG. 2, a second configuration of the gas laser 1 differs from the gas laser of FIG. 1 in that, in the example shown in FIG. 2, the hollow optical fiber 9 is closed at its discharge end 11 which extends out of the laser housing 2 by a transmissive window 13, which is in the form of a focusing lens. The laser resonator 3 further forms a portion of the laser housing 2 and is not arranged inside the coupling chamber 6, unlike in FIG. 1. The coupling chamber 6 forms, together with the optical focusing unit 8, another portion of the laser housing 2 and is arranged beside the laser resonator 3. The laser resonator 3 and the coupling chamber 6 are connected to each other by the decoupling aperture 5.

As discussed above, in some implementations the hollow optical fiber 9 is closed by the transmissive window 13 at the discharge end 11 with a focusing lens. This configuration may allow pressure adjustment in the hollow fiber 9. The discharge end 11 of the hollow fiber 9 can be operated at, for example, the pressure level of the laser resonator 3 and the hollow fiber 9 itself can be used as a pressure-tight laser gas closure. Therefore, it is also possible to reduce the pressure of the space, in which the discharge end 11 of the optical fiber extending out of the laser housing 2 opens, so that laser gas can be pumped out of the laser resonator 3 via the hollow optical fiber 9. In some implementations, an aerodynamic window is placed downstream of the hollow optical fiber.

Figure 3:
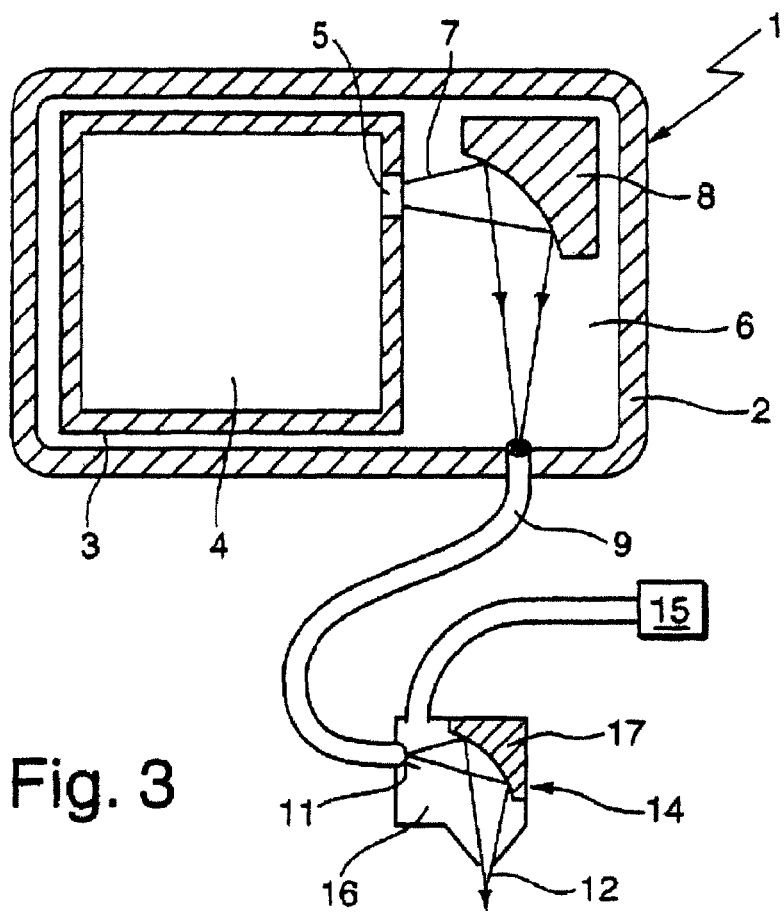
FIG. 3 is an illustration of a third configuration of the gas laser having a hollow optical fiber, which is connected to a laser gas exchange unit, to guide the laser beam out of the laser housing.

Referring to FIG. 3, a third configuration of the gas laser 1 is schematically illustrated. The gas laser 1 shown in FIG. 3 differs from the gas laser of FIG. 1 in that, in the example shown in FIG. 3, the hollow optical fiber 9 is connected to a laser gas exchange unit 15 at the discharge end 11 thereof, which extends out of the laser housing 2, via the processing head 14 of a laser processing machine used, for example, for cutting or welding (not illustrated). This laser gas exchange unit 15 is, for example, a laser gas source whose pressure can be adjusted. The hollow optical fiber 9 opens in a focusing chamber 16 of the processing head 14, in which chamber the laser beam which is discharged from the optical fiber 9 is focused by a focusing mirror 17 onto a workpiece to be processed (not illustrated). The focusing mirror 17 may be, for example, a parabolic or ellipsoidal mirror. The laser beam discharged from the processing head 14 is designated 12. The laser gas exchange unit 15 is connected to the focusing chamber 16, and, thus, can pump laser gas out of the laser housing 2 or laser resonator 3 and/or can pump laser gas into the laser housing 2 or the laser resonator 3 via the hollow optical fiber 9. The laser gas pressure which is present in the laser resonator 3 can be controlled to a desired value by corresponding control of the elevated pressure or reduced pressure of the laser gas exchange unit 15. The laser gas exchange unit 15 may be, for example, a laser gas source that brings about a laser gas flow in one or other direction by corresponding control of elevated pressure or reduced pressure inside the hollow optical fiber 9. In some implementations, the laser gas pressure that is present in the laser resonator 3 is controlled to the desired value by corresponding control of the laser gas exchange unit 15. In some implementations, the laser gas exchange unit 15 also may be a vacuum pump in order to pump laser gas out of the laser resonator 3 and/or the laser housing 2.

Figure 4:
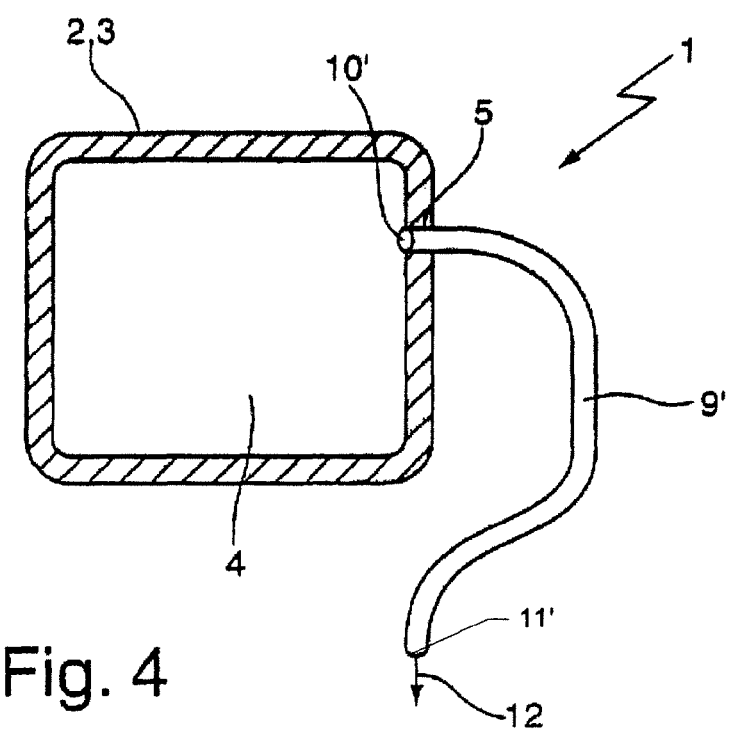
FIG. 4 is an illustration of a fourth configuration of the gas laser having an optical fiber made of solid material for guiding the laser beam out of the laser housing.

Referring to FIG. 4, in a fourth configuration of the gas laser 1 a solid optical fiber 9' extends out of the laser housing 2. The gas laser 1 shown in FIG. 4 differs from the gas lasers discussed with respect to FIGS. 1 to 3 in that, in the example shown in FIG. 4, the optical fiber 9' is not hollow, but instead is composed of solid material and closes the decoupling aperture 5, and in that the laser resonator 3 also forms the laser housing 2. The laser beam which is decoupled from the laser resonator 3 is coupled directly, (e.g., without a coupling chamber such as the coupling chamber 6 discussed above), into an input end 10' of the optical fiber 9'. The laser beam, which is discharged from the solid optical fiber 9' at an output end 11' of the solid optical fiber 9', is designated 12. The optical fiber 9' may be made of, for example, chalcogenide glass fibers or crystalline fibers that include AgBrCl or sapphire. In some implementations, the solid optical fiber 9' is formed from solid material or includes, for example, an outer hollow fiber whose empty space is filled with a material that is transmissive to the wavelength of the laser beam decoupled from the laser resonator 3.

Figure 5:
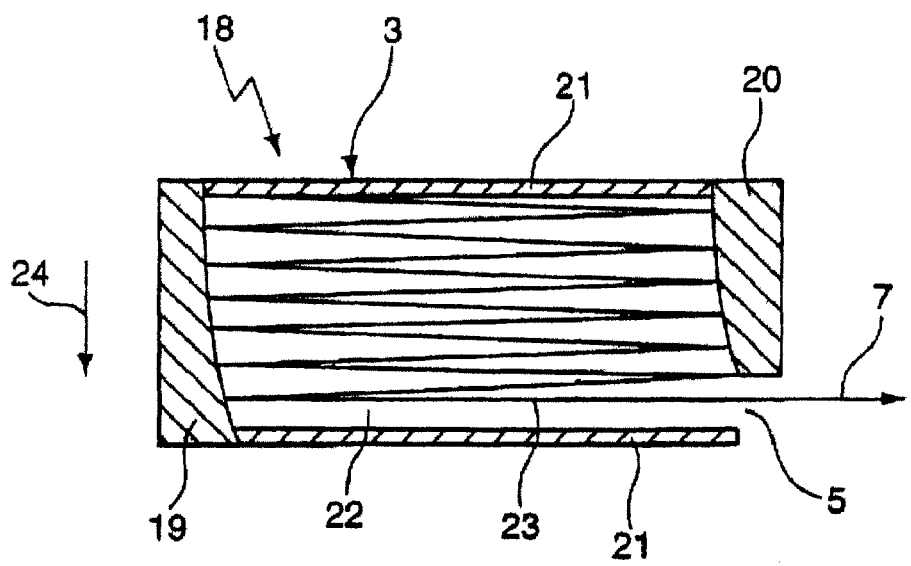
FIGS. 5 and 6 are schematic illustrations of example structures of the unstable laser resonator of FIGS. 1 to 4, showing a slab laser and a coaxial laser, respectively.

FIG. 5 shows schematically the structure of the unstable laser resonator 3 in an implementation in which the unstable laser resonator 3 is a diffusion-cooled slab laser (strip conductor laser) 18. In this implementation, the laser resonator 3 has a concave resonator mirror 19, a convex resonator mirror 20 and a discharge space 22 between the resonator mirror 19 and the convex resonator mirror 20. The discharge space 22, which is delimited by side walls 21, is filled with laser gas and has plate-like electrodes that are not illustrated. All the light beams 23 which propagate in the longitudinal direction of the slab laser 18 between the two resonator mirrors 19, 20 are reflected back and forth between the two resonator mirrors 19, 20 until they have traveled to the decoupling aperture 5 in the direction 24, which is transverse relative to the longitudinal direction. The light beams 23 are decoupled from the laser resonator 3 as a laser beam 7. With regard to further details of the slab laser, reference is made expressly to EP0305893A2, whose complete disclosure is incorporated herein by reference. Unlike in EP0305893A2, the laser resonator 3 does not form an enclosed gas-tight unit owing to the decoupling aperture 5, which is not closed.

Figure 6:
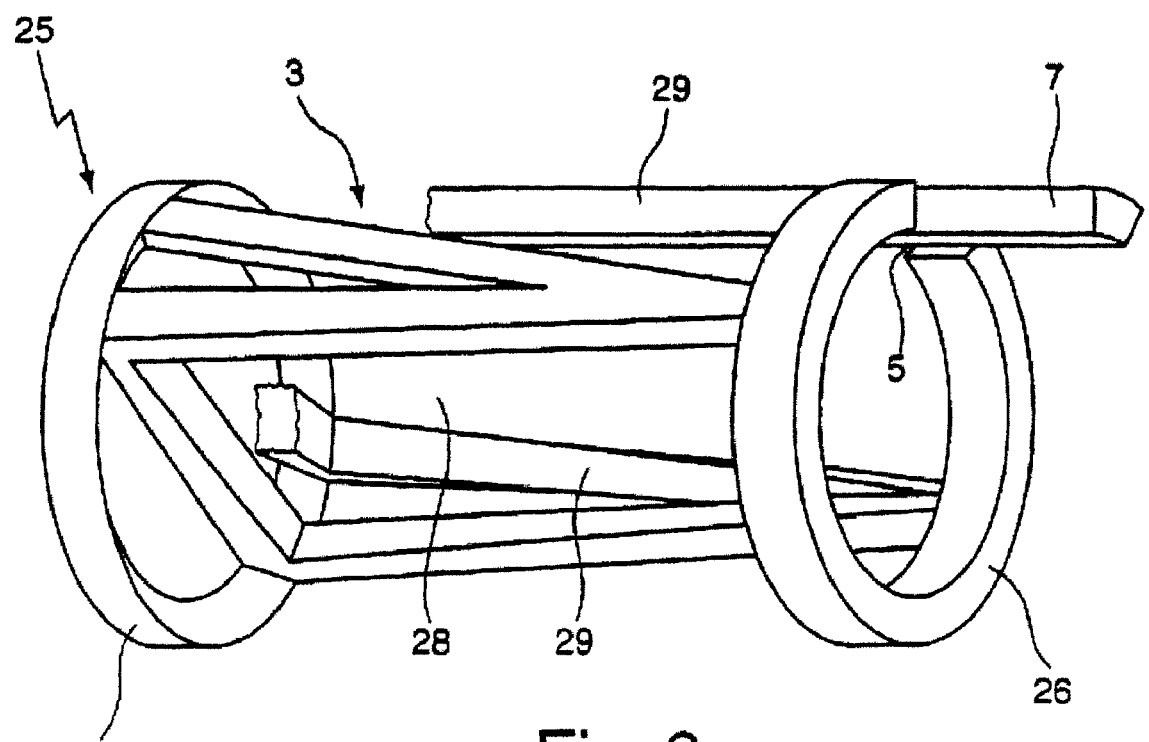

FIG. 6 shows schematically the structure of the unstable laser resonator 3 in an implementation in which the unstable laser resonator 3 is a diffusion-cooled coaxial laser 25. In this implementation, the laser resonator 3 has two annular resonator mirrors 26, 27 and an annular discharge space 28 between the two annular resonator mirrors 26, 27. The annular discharge space 28 is delimited by cylindrical electrodes (not illustrated) and the annular discharge space 28 is filled with laser gas. One resonator mirror 26 is constructed in the azimuthal direction in such a manner that the laser beam 29 extends azimuthally in the annular discharge space 28. The other resonator mirror 27 is constructed so as to be conical having a cone angle which is less than or equal to 90° and redirects the laser beam 29 into an opposing azimuthal region. From that location, the laser beam 29 is again reflected back onto the resonator mirror 26 until the laser beam 29 is finally decoupled from the laser resonator 3 by the decoupling aperture 5 which is provided in the resonator mirror 26 as a laser beam 7. With regard to additional details of the coaxial laser, reference is made expressly to EP0911922 A1, whose entire disclosure is incorporated herein by reference. Unlike in EP0911922 A1, the laser resonator 3 does not form an enclosed gas-tight unit owing to the decoupling aperture 5 which is not closed.

The foregoing description is intended to illustrate and not limit the scope of the techniques discussed above. Other aspects, advantages, and modifications are within the scope of the following claims.

What is claimed is:

1. A gas laser comprising:
   an unstable laser resonator disposed in a laser housing, the laser housing being filled with laser gas; and
   a hollow optical fiber configured to guide a laser beam decoupled from the laser resonator out of the laser housing,
   wherein the hollow optical fiber has an open fiber end into which the laser beam decoupled from the laser resonator is coupled, the hollow optical fiber being connected to the laser resonator or the laser housing by the open fiber end, and
   wherein the laser resonator has a decoupling aperture configured to decouple the laser beam from the laser resonator and introduce the laser beam into a coupling chamber in which the decoupled laser beam is coupled into the hollow optical fiber.

2. The gas laser of claim 1, further comprising an optical focusing unit arranged in the coupling chamber and configured to couple the laser beam into the hollow optical fiber.

3. The gas laser of claim 2, wherein the optical focusing unit comprises a focusing mirror.

4. The gas laser of claim 1, wherein the hollow fiber has a discharge end that is closed by a transmissive window.

5. The gas laser of claim 4, wherein the transmissive window comprises a focusing lens.

6. The gas laser of claim 1, wherein the hollow fiber has a discharge end that is open to atmosphere.

7. The gas laser of claim 1, wherein the hollow fiber has a discharge end that is connected to a laser gas exchange unit configured to pump laser gas out of the laser housing or into the laser housing via the hollow fiber.

8. The gas laser of claim 7, wherein the laser gas exchange unit is controlled by laser gas pressure in the laser resonator.

9. The gas laser of claim 1, wherein the hollow fiber has a discharge end that opens in a processing head of a laser processing machine.

10. The gas laser of claim 1, wherein the gas laser is a slab laser.

11. The gas laser of claim 1, wherein the gas laser is a coaxial laser.

12. The gas laser of claim 1, wherein the hollow optical fiber comprises one or more of an internally coated hollow fiber that includes quartz, a Bragg reflection fiber or a photonic bandgap fiber that includes chalcogenide.

13. A gas laser comprising:
   a laser housing including a coupling chamber, each of the laser housing and the coupling chamber being filled with a same laser gas;
   an unstable laser resonator disposed in the laser housing, wherein the coupling chamber is outside of the unstable laser resonator, and wherein the unstable laser resonator includes a decoupling aperture configured to:
      allow the laser gas to pass between the unstable laser resonator and the coupling chamber; and
      allow the laser beam to decouple from the unstable laser resonator; and
   a hollow optical fiber configured to guide a laser beam decoupled from the unstable laser resonator out of the laser housing,
   wherein the hollow optical fiber has an open fiber end into which the laser beam decoupled from the unstable laser resonator is coupled, the hollow optical fiber being connected to the unstable laser resonator or the laser housing by the open fiber end.

* * * * *